(12) United States Patent
Guidi et al.

(10) Patent No.: US 11,934,753 B2
(45) Date of Patent: Mar. 19, 2024

(54) AUTOMATIC PARAMETRIZATION OF A CAD MODEL

(71) Applicant: BRICSYS NV, Ghent (BE)

(72) Inventors: Chloë Guidi, Dendermonde (BE); Jürgen De Zaeytijd, Merelbeke (BE); Tjerk Gauderis, Ghent (BE); Egor Ermolin, Berdsk (RU)

(73) Assignee: BRICSYS NV, Ghent (BE)

( * ) Notice: Subject to any disclaimer, the term of this patent is extended or adjusted under 35 U.S.C. 154(b) by 324 days.

(21) Appl. No.: 17/263,489

(22) PCT Filed: Aug. 19, 2019

(86) PCT No.: PCT/EP2019/072178
§ 371 (c)(1),
(2) Date: Jan. 26, 2021

(87) PCT Pub. No.: WO2020/038902
PCT Pub. Date: Feb. 27, 2020

(65) Prior Publication Data
US 2021/0173981 A1  Jun. 10, 2021

(30) Foreign Application Priority Data

Aug. 20, 2018 (EP) ..................................... 18189647

(51) Int. Cl.
*G06F 30/23* (2020.01)
*G06T 17/20* (2006.01)
(Continued)

(52) U.S. Cl.
CPC .............. *G06F 30/23* (2020.01); *G06T 17/20* (2013.01); *G06F 2111/04* (2020.01); *G06F 2111/10* (2020.01)

(58) Field of Classification Search
CPC .. G06F 30/23; G06F 2111/04; G06F 2111/10; G06F 30/25; G06F 30/367;
(Continued)

(56) References Cited

U.S. PATENT DOCUMENTS 8,890,867 B2 * 11/2014 Buchowski ............. G06T 19/20
345/420
2017/0161620 A1 * 6/2017 Junker ................... G06N 5/045

OTHER PUBLICATIONS

Junker et al in view of D. Serrano, "Automatic Dimensioning in Design for Manufacturing" pp. 379-386, ACM 1991 (Year: 1991).*
(Continued)

*Primary Examiner* — Kibrom K Gebresilassie
(74) *Attorney, Agent, or Firm* — Maschoff Brennan

(57) ABSTRACT

A CAD model comprises a set of at least three subentities. A candidate set of pairwise numerical constraints is obtained for the set of subentities, such that a first graph, representing the subentities of the set of subentities as nodes and the pairwise numerical constraints of the candidate set as edges, is connected. A minimal spanning subset of pairwise numerical constraints is obtained from the candidate set, such that a second graph, representing the subentities of the set of subentities as nodes and the pairwise numerical constraints of the minimal spanning subset as edges, is a spanning tree. A parameter set to parameterize the pairwise numerical constraints of the minimal spanning subset is determined. The parameter set and parametric constraints, based on the parameter set and the numerical values of the numerical constraints of the minimal spanning subset, are added to the CAD model.

18 Claims, 2 Drawing Sheets

(51) Int. Cl.
*G06F 111/04* (2020.01)
*G06F 111/10* (2020.01)

(58) Field of Classification Search
CPC ............... G06F 30/398; G06F 2111/00; G06F 2119/02; G06T 17/20
See application file for complete search history.

(56) References Cited

OTHER PUBLICATIONS

D. Serrano, "Automatic Dimensioning in Design for Manufacturing", pp. 379-386, ACM 1991.*

D. Serrano, "Automatic Dimensioning in Design for Manufacturing", SMA '91 Proceedings of the first ACM symposium on Solid modeling foundations and CAD/CAM applications, pp. 379-386 (1991), ISBN 0-89791-427-9, doi: 10.1145/112515.112568.

R. S. Latham and A. E. Middleditch, "Connectivity analysis: a tool for processing geometric constraints", Computer-Aided Design 28(11), 917-928 (1996), doi: 10.1016/0010-4485(96)00023-1.

Bond A H et al, "Rule-Based Automatic Dimensioning", Jan. 1, 1987 (Jan. 1, 1987), Engrais Phosphates, Paris, Dunod, FR, pp. 128-135.

Anonymous, "Automatically dimension and constrain sketch", Feb. 13, 2014 (Feb. 13, 2014), p. 1-2, Retrieved from the Internet: URL:https://knowledge.autodesk.com/support/inventor-products/learn-explore/caas/CloudHelp/cloudhelp/2014/ENU/Inventor/files/GUID-6A730833-27D3-4183-988C-3DD48D153946-htm.html.

* cited by examiner

AUTOMATIC PARAMETRIZATION OF A CAD MODEL

TECHNICAL FIELD

The invention pertains to the technical field of computer-aided design (CAD), and in particular to parameters and parametric constraints for CAD models.

BACKGROUND

A computer-aided design (CAD) model may comprise one or more entities. An entity may comprise one or more subentities, such as, for example, surfaces (faces), lines (edges), and vertices. A user may add constraints for one or more subentities. For example, a user may constrain the distance between two parallel faces to a particular numerical value. Modelling operations on a subentity may result in corresponding changes for another subentity in case a mutual constraint is present. For example, upon repositioning a face of two parallel faces under a distance constraint, the other face may automatically be repositioned in order to maintain the distance constraint.

A user may also add parameters and parametric constraints for subentities. Consider, for example, a building information model (BIM) comprising multiple walls, whereby a user may define a wall thickness parameter, set the wall thickness parameter to a particular numerical value, and parametrically constrain the distance of relevant parallel faces of these walls to the wall thickness parameter. Upon adjusting the numerical value of the wall thickness parameter, the distances between all the relevant parallel faces of these walls are automatically adjusted at once, significantly lowering the user effort for editing the BIM. Under-constraining a CAD model may hence in certain cases be particularly advantageous.

Not all CAD models comprise parameters and/or parametric constraints. Even if a CAD model comprises a parameter and/or a parametric constraint, many other parameters and/or parametric constraints may be of interest. Upon opening a CAD model comprising parameters and/or parametric constraints in an incompatible CAD software program, the parameters and/or parametric constraints may not be correctly incorporated.

Consider an exemplary CAD model comprising $N \geq 10$ parallel faces. The CAD model comprises computer-readable data to determine the $N(N-1)/2$ relative numerical distance values $v_{ij}$ (e.g. '1000' or '10 m') between all pairs of faces i and j. Introduction in the CAD model of a distance parameter $d_{ij}$ and parametric constraint $d_{ij}=v_{ij}$ for each numerical distance value $v_{ij}$, would lead to over-constraining. Random selection of N–1 numerical distance values, for which a distance parameter and a parametric constraint is introduced, may split the faces into two subsets of faces, without parametric constraint between the subsets of faces, but in which the relative distances of the faces of a particular subset are over-constrained.

AutoCAD 2016 comprises an AUTOCONSTRAIN command to apply geometric constraints to a selection set of objects in a 2D drawing based on orientation of the objects relative to one another.

D. Serrano, "Automatic Dimensioning in Design for Manufacturing", SMA '91 Proceedings of the first ACM symposium on Solid modeling foundations and CAD/CAM applications, pages 379-386 (1991), ISBN 0-89791-427-9, doi: 10.1145/112515.112568, discloses constraint handling via graph theory. Starting from a set N of parameters (variables; e.g. Cartesian coordinates $x_1$, $y_1$, $x_2$, $y_2$, $x_3$, $y_3$) and a set F of constraints (e.g. $C_1$ to $C_{11}$; based on the variables, and known numerical dimensional values e.g. $d_1$, $d_2$, $d_3$, $d_4$, $d_5$, $\theta_1$, $\theta_2$, $\theta_3$), a bipartite matching graph is constructed connecting parameter nodes and constraint nodes via edges. The bipartite matching graph is converted into a directed graph, connecting parameter nodes via constraint edges. A constraint (e.g. $C_6$) may correspond with multiple constraint edges of the bipartite graph. In the graph theoretical methodology of Serrano, the choice of parameter set N has been made beforehand and subsets of F, which do not over- or under-constrain, are to be selected.

Serrano teaches the constraining of entities with spatial extent (e.g. a plane or surface) via constraining characteristic points thereof, which is inefficient. Serrano in addition presupposes the existence of the set F of constraints, and remains silent on automatic generation of constraints.

R. S. Latham and A. E. Middleditch, "Connectivity analysis: a tool for processing geometric constraints", Computer-Aided Design 28(11), 917-928 (1996), doi: 10.1016/0010-4485(96)00023-1, discloses constraint handling via graph theory. A connectivity graph is constructed, wherein edges link constraint nodes with entity nodes, in case a corresponding constraint constrains a corresponding entity.

In section "EXAMPLE APPLICATION" a preprocessor is used to deduce constraints and entities from drawing data. FIG. 11 of Latham shows entities and constraints deduced from FIG. 10 of Latham by the preprocessor. The teaching of Latham is then used to detect and suggest corrections for errors in the set of constraints. For the teaching of Latham, a parameter set and a trial set of constraints have been generated beforehand (by the preprocessor). The graph theoretical methodology of Latham is then used to assess the trial set of constraints.

There remains a need in the art for automatically generating parameters and parametric constraints. There remains a need in the art for automatically generating parameters and parametric constraints for 3D CAD models and/or 3D entities. The present invention aims to parametrize a CAD model.

The present invention aims to resolve at least some of the problems mentioned above.

SUMMARY OF THE INVENTION

In a first aspect, the present invention provides a computer-implemented method (CIM) for automatic parametrization of a computer-aided design (CAD) model, according to claim 1.

In a second aspect, the present invention provides a computer system for automatic parametrization of a CAD model, whereby the computer system is configured for performing the CIM according to the first aspect.

In a third aspect, the present invention provides a computer program product (CPP) for automatic parametrization of a CAD model, whereby the CPP comprises instructions which, when the CPP is executed by a computer, cause the computer to carry out the CIM according to the first aspect. The present invention may further provide a tangible non-transitory computer-readable data carrier comprising the CPP.

The present invention is advantageous as it provides for automatic generation of a parameter set and corresponding parametric constraints for a CAD model. The parametric constraints ensure that the parametrized CAD model corresponds to the original CAD model, i.e. the same geometric properties for a subentity and relative geometric properties between subentities may be derived from the CAD models before and after the parametrization. The present invention is further advantageous as it is not limited to two-dimensional drawings and works equally well for CAD models comprising three-dimensional solids.

Determination of the parameter set based on the minimal spanning subset, and therefore after obtaining the minimal spanning subset, is particularly advantageous.

Because the parameters are based on the minimal spanning subset, a convenient parameter set for the particular minimal spanning subset may be chosen. This has to be contrasted with Serrano, wherein selection of the constraints (e.g. according to FIG. 11(a) of Serrano) would still lead to parametric constraints based on the a priori chosen parameter set (e.g. Cartesian coordinates). In contrast, choosing the parameter set based on a minimal set of constraints (e.g. choosing angles, edge lengths and/or projected edge lengths as parameters for the constraints according to FIG. 11(a) of Serrano) may lead to more compact parametric constraint expressions and easier computer-implemented handling, optimization, and the like.

A priori determination of an under-parametrized parameter set (e.g. comprising a single wall thickness parameter for multiple wall thicknesses), and subsequent determination of parametric constraints therefor, may lead to unresolvable or hard-to-resolve requirements. By first selecting numerical constraints, it may first be assured that they do not over- or under-constrain the CAD model, allowing subsequent introduction of parameters, potentially in number smaller than the number of constraints, without any assumptions for constraint selection.

The parameter set and the corresponding parametric constraints are added to the CAD model. After performing the CIM according to the first aspect, the CAD model is hence modified and comprises computer-readable data representing the parameters of the parameter set as well as the parametric constraints.

DETAILED DESCRIPTION OF THE INVENTION

Figure 1:
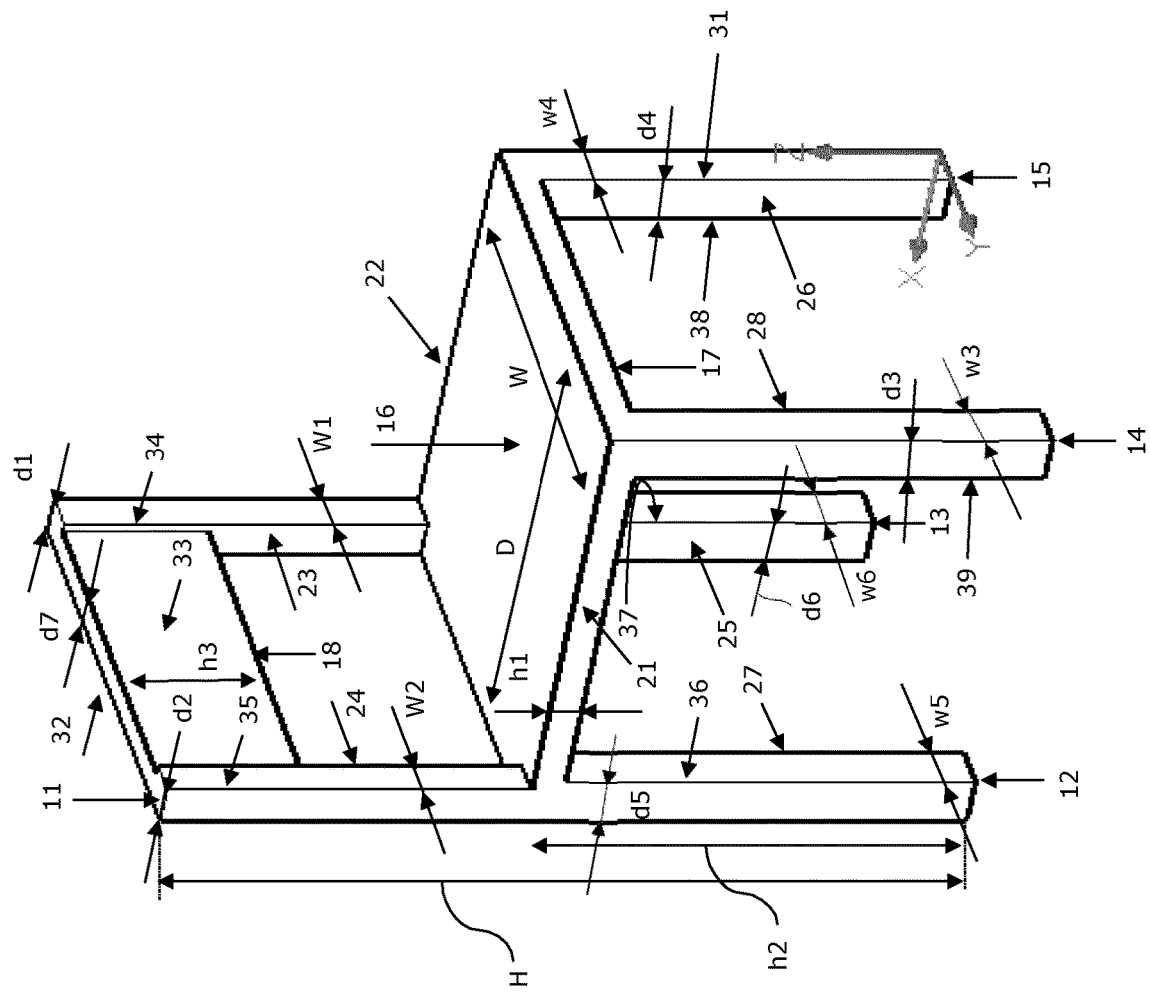
FIGS. 1 and 2 show two-dimensional images of exemplary CAD models comprising a three-dimensional solid for which a parameter set and corresponding parametric constraints may be determined according to an embodiment of the present invention.

The present invention concerns a computer-implemented method (CIM), a computer system, and a computer program product (CPP) for automatic parametrization of a computer-aided design (CAD) model. The present invention has been summarized in the corresponding section above. In what follows, the present invention is described in detail, preferred embodiments are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context dearly dictates otherwise. By way of example, "a compartment" refers to one or more than one compartment.

"Comprise", "comprising", "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, and steps.

"Based on" as used herein is synonymous with "based at least in part on" and is an inclusive or open-ended term that specifies the presence of what follows (e.g. component) and does not exclude or preclude the presence of additional, non-recited components, features, elements, members, and steps.

A "computer-aided design model" (CAD model), as used herein, comprises computer-processable data, preferably digital data, about one or more entities. An entity, as used herein, is preferably a three-dimensional solid. Each entity comprises one or more subentities, such as, for example, surfaces (faces), lines (edges), and vertices. The computer-processable data represents, or allows to derive, a geometric property of a subentity and a relative geometric property between two subentities.

An exemplary file format for storing a CAD model is DWG. A CAD model comprises a computer-processable image in vector format, e.g. in DWG file format, defined in terms of low-level features, such as, for example, vertices, lines (edges), and surfaces (faces).

A non-limiting list of "geometric properties" of a subentity comprises a position; an orientation; a dimension; an inclination; and a radius of curvature. A non-limiting list of "relative geometric properties" of two subentities comprises a relative distance; a relative orientation; a relative position; a relative angle; and a relative size.

A CAD model may be viewed and edited via a corresponding CPP, so-called CAD software. CAD software may provide a graphical user interface (GUI) for viewing and editing the CAD model. A non-limiting list of examples of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ.

A "numerical constraint", as used herein, refers to any type of constraint which may be characterized by a numerical value. A non-limiting list of examples of numerical constraints comprises a numerical distance constraint, a numerical angle constraint, a coincidence constraint (which may be characterized by a distance of 0 distance units), a parallelity constraint (which may be characterized by an angle of 0°), and a perpendicularity constraint (which may be characterized by an angle of 90°).

A relative geometric property of two subentities may be constrained via a pairwise numerical constraint. A parameter may be created. A numerical value may be assigned to a parameter. A relative geometric property may be constrained via a parametric constraint based on a parameter or a functional expression based on one or more parameters. A numerical dimensional constraint for an entity may be equivalent to a numerical distance constraint for two subentities of the entity. A numerical length constraint for a straight edge, for example, is equivalent to a pairwise numerical distance constraint for the endpoints of the edge.

In a first aspect, the present invention provides a CIM for automatic parametrization of a CAD model. In a second aspect, the present invention provides a computer system for automatic parametrization of a CAD model. The computer system is configured for performing the CIM according to the first aspect. In a third aspect, the present invention provides a CPP for automatic parametrization of a CAD model. The CPP comprises instructions for performing the CIM according to the first aspect. The CPP comprises in particular instructions which, when the CPP is executed by a computer, such as a computer system according to the second aspect, cause the computer to carry out the CIM according to the first aspect. The present invention may further also provide a tangible non-transitory computer-readable data carrier comprising the CPP. The three aspects of the present invention are hence interrelated. Therefore, any feature disclosed in this document may relate to each of the aspects of the present invention, even if it has been disclosed in conjunction with a particular aspect.

The CAD model comprises a set of at least three subentities. Preferably, the CAD model comprises a set of at least four, more preferably at least five, even more preferably at least six, subentities. The set of subentities may thereby comprise all subentities of the CAD model. Alternatively, the set of subentities may thereby comprise a subset of all subentities of the CAD model, such as, for example, all faces of the CAD model, all faces of the CAD model perpendicular to a common normal direction, or a subset of all faces of the CAD model perpendicular to a common normal direction. Preferably, the model comprises a three-dimensional solid comprising a subentity of the set of subentities.

The CIM comprises several steps. A candidate set of pairwise numerical constraints for the set of subentities is obtained. The candidate set is obtained so that a first graph comprising nodes and edges, whereby each subentity of the set of subentities is represented by a node of the first graph and each pairwise numerical constraint of the candidate set is represented by an edge of the first graph, is connected. A minimal spanning subset of pairwise numerical constraints is obtained from the candidate set. The minimal spanning subset is obtained so that a second graph comprising nodes and edges, whereby each subentity of the set of subentities is represented by a node of the second graph and each pairwise numerical constraint of the minimal spanning subset is represented by an edge of the second graph, is a spanning tree. A parameter set to parameterize the pairwise numerical constraints of the minimal spanning subset is determined. The parameter set and parametric constraints are added to the CAD model. The parametric constraints are based on the determined parameter set and the numerical values of the numerical constraints of the minimal spanning subset.

Obtaining the candidate set may involve obtaining a pre-existing numerical constraint from the CAD model. Obtaining the candidate set may involve determining a pairwise numerical constraint from the CAD model based on a relative geometric property of two subentities of the set of subentities. When no corresponding constraint is present, a relative geometric property, for example a distance between two parallel faces, may still be altered during modelling, for example upon repositioning one of said faces. A numerical constraint, for example a distance constraint between two parallel faces, effects that a relative geometric property is maintained during modelling. For example, upon repositioning one of said faces, the other face is repositioned as well to maintain the relative distance of the distance constraint.

Computer-processable first graph data representing the first graph, i.e. representing the nodes and the edges of the first graph, may be generated during the determination of the candidate set. The first graph data may be processed to computer-processable second graph data representing the second graph, i.e. representing the nodes and the edges of the second graph, during the determination of the minimal spanning subset.

Computer-processable candidate data representing the candidate set of pairwise numerical constraints may be generated during the determination of the candidate set. The candidate data, optionally in conjunction with the CAD model, allow to generate computer-processable first graph data representing the first graph. The candidate data may be processed to computer-processable minimal spanning data representing the minimal spanning subset of pairwise numerical constraints during the determination of the minimal spanning subset. The minimal spanning data, optionally in conjunction with the CAD model, allow to generate computer-processable second graph data representing the second graph.

The above-mentioned first and second graph criteria, i.e. the first graph being connected and the second graph being a spanning tree, may be verified via the candidate data and the minimal spanning data, in any suitable way, with or without generating the first and second graph data. The formulation "so that a first graph is connected" does not necessarily imply generation of first graph data. The formulation "so that a second graph is a spanning tree" does not necessarily imply generation of second graph data.

The first graph being connected is equivalent to any two subentities A and B of the set of subentities being directly or indirectly constrained via one or more pairwise numerical constraints of the candidate set. When the subentities A and B are directly constrained, the candidate set comprises a pairwise numerical constraint for A and B. When the subentities A and B are indirectly constrained, the set of subentities comprises $N \geq 1$ subentities $\{X_1, \ldots, X_N\}$ other than A and B, whereby the candidate set comprises:
  a pairwise numerical constraint for A and $X_1$;
  if $N>1$, a pairwise numerical constraint for $X_{M-1}$ and $X_M$, for each integer M for which $2 \leq M \leq N$; and
  a pairwise numerical constraint for $X_N$ and B.

While this property of the candidate set may be efficiently verified via first graph data and a suitable graph algorithm and/or graph computer program product instructions, other equivalent ways of verification are possible.

The first graph is connected. The first graph may thereby be fully connected. The first graph may alternatively be connected, but not fully connected. In the former case, the candidate set comprises a pairwise numerical constraint for any two subentities of the set of subentities. Preferably, the first graph is fully connected.

The second graph being a spanning tree is equivalent to any two subentities of the set of subentities being directly or indirectly constrained via one or more numerical constraints from the minimal spanning subset and the minimal spanning subset comprising a number of pairwise numerical constraints equal to one less than the number of subentities in the set of subentities. While determination of the minimal spanning subset may be efficiently performed via second graph data and a suitable graph algorithm and/or computer program product instructions, other equivalent ways of determination are possible.

The present invention is advantageous as it provides for automatic generation of a parameter set and corresponding parametric constraints for a CAD model. The parametric constraints ensure that the parametrized CAD model corresponds to the original CAD model, i.e. the same geometric properties for a subentity and relative geometric properties between subentities may be derived from the CAD models before and after the parametrization. The present invention is further advantageous as it is not limited to two-dimensional drawings and works equally well for CAD models comprising a three-dimensional solid. The present invention is particularly advantageous as it provides for determination of relevant parameters and parametric constraints, which in case of an unconstrained CAD model are, or lie close to, intended design parameters of the unconstrained CAD model.

Determination of the parameter set based on the minimal spanning subset, and therefore after obtaining the minimal spanning subset, is particularly advantageous:
  A convenient parameter set for the particular minimal spanning subset may be chosen. This has to be contrasted with Serrano, wherein selection of the constraints would still lead to parametric constraints based on the a priori chosen parameters.
  A priori determination of an under-parametrized parameter set (e.g. comprising a single wall thickness parameter for multiple wall thicknesses), and subsequent determination of parametric constraints therefor, may lead to unresolvable or hard-to-resolve requirements. By first selecting numerical constraints, it may first be assured that they do not over- or under-constrain the CAD model, allowing subsequent introduction of parameters, potentially in number smaller than the number of constraints, without any assumptions for constraint selection.

The parameter set and the corresponding parametric constraints are added to the CAD model. The CAD model is modified and comprises computer-processable parameter data representing the parameters of the parameter set and parametric constraint data representing the parametric constraints. The CAD model comprising the parameter data and the parametric constraint data may be stored on a tangible non-transitory computer-readable storage medium. The computer system may comprise the storage medium. The stored CAD model then comprises the parameter data and the parametric constraint data so that it does not have to be regenerated, e.g. upon reloading the CAD model.

In a preferred embodiment, the CAD model comprising the parameter set and the parametric constraints is stored on a tangible non-transitory computer-readable storage medium.

In a preferred embodiment, determining the parameter set comprises the step of associating a direct parameter with each uniquely occurring numerical value of the numerical constraints of the minimal spanning subset. A relative geometric property may be constrained via a parametric constraint based on a direct parameter. When a numerical value of a numerical constraint associated with a CAD model occurs multiple times, it is advantageous to be able to change all numerical values simultaneously. This can be achieved by associating a single parameter with these numerical values.

In an example, a CAD model comprises a 3D solid representing a beam with a plurality of through-holes. Each through-hole is cylindrical in shape and comprises a position property, an orientation property, and a radial size property. The numerical radial sizes of all through-holes are identical. By associating one direct parameter with the identical numerical radial sizes, setting the radial size property of the cylindrical through-holes equal to the direct parameter, and constraining the direct parameter to be equal to the numerical radial sizes, several advantages are obtained, including (1) reduced user effort in simultaneous modification of all radial size properties by editing the parametric constraint, (2) simultaneous modification of all radial size properties during automated optimization of a cost function (recognizing and maintaining model design intent during automated optimization), as well as (3) compression of the CAD model.

In an example, the minimal spanning subset comprises X numerical constraints for similar geometric or relative geometric properties, wherein the X numerical constraints comprise an identical numerical value. A numerical value is represented by a Z-bit floating point number. A parameter is represented by a Y-bit parameter pointer, with $Y<Z$. In addition, U bits are needed to denote the field type (e.g. floating point number, integer, parameter pointer, equation pointer, and the like) of a geometric or relative geometric property. Prior to the parametrization, $X*(Z+U)$ bits are needed to set the geometric or relative geometric properties equal to the identical numerical value. After the parametrization:
  $X*(Y+U)$ bits are needed to set the geometric or relative geometric properties equal to the direct parameter;
  $Y+Z+W$ bits are needed to define the parametric constraint, whereby W represents a parametric constraint overhead which does not scale with X.

For 64-bit floating point numbers, 8-bit pointers, and 64-bit overhead for defining an equality parametric constraint, compression of the CAD model is already achieved for $X \geq 3$.

In a preferred embodiment, determining the parameter set further comprises determining for a substitutable direct parameter a new parameter and a functional expression expressing the substitutable direct parameter in function of the new parameter and at least one other direct parameter. The substitutable direct parameter may be removed from the parameter set. The new parameter may be added to the parameter set. A relative geometric property may be constrained via a parametric constraint based on the functional expression. A numerical value for the new parameter may be calculated based on the functional expression and the numerical values associated with the at least one other direct parameter and the substitutable direct parameter.

It may be advantageous to represent a parametric constraint in terms of multiple parameters. An example is a support of a long table positioned in the middle of the long table. Rather than using pm (total length) for the total length of the table and pm (distance to edge) for the distance of the support to the edge of the table as direct parameters directly obtainable from numerical distance constraints, it may be more suitable to represent the distance of the support to the edge as a fraction of the total length. In this example, the substitutable direct parameter is pm (distance to edge), the new parameter is pm (fraction), and the at least one other direct parameter is pm (total length). In this example, the distance of the support to the edge which can be constrained via a parametric constraint based on pm (distance to edge), would now be constrained via a parametric constraint based on a functional expression comprising the product of pm (fraction) and pm (total length). Such a computer-implemented detection of design intent may be realized in various ways, for example via heuristic rules. Alternatively or additionally, it may be realized via clustering, as discussed below.

In an alternative or further embodiment, determining the parameter set further comprises determining for a removable direct parameter a functional expression expressing the removable direct parameter in function of at least one other direct parameter. The removable direct parameter may be removed from the parameter set. A relative geometric property may be constrained via a parametric constraint based on the functional expression.

It may be advantageous to reduce the number of parameters in the parameter set. An example is a support of a long table positioned in the middle of the long table. Rather than using pm (total length) for the total length of the table and pm (distance to edge) for the distance of the support to the edge of the table as direct parameters directly obtainable from numerical distance constraints, it may be more suitable to remove pm (distance to edge) from the parameter set. The distance of the support to the edge which can be constrained via a parametric constraint based on pm (distance to edge), would now be constrained via a parametric constraint based on a functional expression comprising the product of 0.5 and pm (total length).

A subentity may be a face (surface), an edge (line) or a vertex (point). In a preferred embodiment, the set of at least three subentities comprises at least three mutually parallel faces. In this embodiment, a numerical constraint of the minimal spanning subset is a distance constraint.

One of ordinary skill in the art will appreciate that while the set of subentities comprises at least three mutually parallel faces, this does not necessarily imply that all entities of the set of subentities are faces. The set of subentities may consist of at least three mutually parallel faces. The set of subentities may comprise a face non-parallel with the set of at least three mutually parallel faces. The set of subentities may comprise a subentity which is not a face, e.g. an edge.

One of ordinary skill in the art will appreciate that while a numerical constraint of the minimal spanning subset is a distance constraint, this does not necessarily imply that all numerical constraints (of the minimal spanning subset) are distance constraints. The minimal spanning subset may consist of pairwise numerical distance constraints. The minimal spanning subset may comprise a pairwise numerical constraint which is not a distance constraint, e.g. an angle constraint.

The model may comprise multiple sets of subentities, whereby at least one set of subentities comprises at least three mutually parallel faces. The steps according to the present invention are preferably performed for each set of subentities.

The model may comprise a set of subentities, which comprises for each normal direction of multiple non-parallel normal directions at least three faces orthogonal to the normal direction. The candidate set of pairwise numerical constraints may comprise numerical distance constraints for pairs of mutually parallel faces and numerical angle constraints for pairs of mutually non-parallel faces. The steps according to the present invention are performed for the set of subentities. Via clustering, discussed further below, the faces of the set of subentities may be grouped per normal direction into one or more clusters.

The direct parameters may comprise an overall direct distance parameter associated with an overall numerical distance constraint for an overall pair of parallel faces. The overall numerical distance constraint comprises an overall numerical value. The substitutable direct parameter may be a distance parameter. The substitutable direct distance parameter may be associated with a second numerical distance constraint for a second pair of parallel faces. The second numerical distance constraint comprises a second numerical value. In a preferred embodiment, the faces of the overall and the second pair are parallel and the overall numerical value is larger than the second numerical value. Preferably, the overall numerical value is maximal over the numerical values of the numerical distance constraints for all pairs of faces of the set of subentities which are parallel to the overall pair of faces. The inventors have observed that it is advantageous to substitute a direct distance parameter which is not the largest distance parameter in a particular direction with another parameter. The largest distance parameter in a particular direction, i.e. the overall direct distance parameter, is typically associated with a global dimension of the model, such as a length, a width or a height of the model.

In a preferred embodiment, one or more reference planes are determined. Each reference plane comprises one face or multiple coplanar faces of the set of subentities. For each reference plane a centroid of the faces comprised within the reference plane, i.e. the faces which the reference plane comprises, is determined. Preferably, the centroid is an area-weighted centroid of the faces comprised within the reference plane. The centroid comprises coordinates. For the centroids, a number of clusters K is determined based on the coordinates of the centroids. The centroids are partitioned into K clusters, based on the coordinates of the centroids. A direct distance parameter, which is associated with a numerical distance constraint, is associated with a cluster which comprises a centroid of a reference plane comprising a face associated with said distance constraint. Preferably, each direct distance parameter, which is associated with a numerical distance constraint, is associated with a cluster when the cluster comprises a centroid of a reference plane comprising a face associated with said distance constraint. For a cluster a substitutable direct distance parameter associated with the cluster is identified. For an identified substitutable direct distance parameter, a new parameter and a functional expression are determined, whereby the functional expression expresses the identified substitutable direct distance parameter in function of the new parameter and at least one other direct distance parameter. The number of clusters K may be determined and the partitioning into K clusters may performed via a k-means clustering algorithm, such as, for example, Lloyd's algorithm (doi: 10.1109/TIT.1982.1056489) or a variation thereof.

In a preferred embodiment, a substitutable direct distance parameter is identified for a cluster in case, i.e. on the condition that, the second numerical value is maximal over the numerical values of the numerical distance constraints associated with the direct distance parameters which are associated with said cluster and which are not the overall direct distance parameter.

In a preferred embodiment, a substitutable direct distance parameter is identified for a cluster in case, i.e. on the condition that, the second numerical value lies within fractional bounds of the overall numerical value. Preferably, said fractional bounds comprise a lower bound and an upper bound. Preferably, said fractional bounds comprise a lower bound of in between 2% and 30%, more preferably in between 4% and 24%, even more preferably in between 6% and 18%, yet even more preferably in between 8% and 12%, and most preferably of 10%. Preferably, said fractional bounds comprise an upper bound of in between in between 70% and 98%, more preferably in between 76% and 96%, even more preferably in between 82% and 94%, yet even more preferably in between 88% and 92%, and most preferably of 90%.

In a preferred embodiment, determining for the identified substitutable direct distance parameter a new parameter and a functional expression comprises the following steps. A target centroid of an intersection of the faces of the overall pair projected onto a projection plane parallel to the overall pair of faces along a direction perpendicular to the overall pair of faces is determined. The intersection is hereby the overlap of the projected faces in the projection plane. For each test numerical distance constraint for a test pair of parallel faces associated with a test direct distance parameter, for which the faces are perpendicular to the normal direction, a cluster is associated with both the test and the substitutable direct distance parameter, and the test direct distance parameter is not the overall or the substitutable direct distance parameter, it is verified whether both faces of the test pair projected onto the projection plane along the normal direction comprise the target centroid. The functional expression then comprises the new parameter multiplied with a linear combination of at least one other direct distance parameter. Preferably, said linear combination comprises the overall direct distance parameter subtracted with, per test distance constraint for which both projected faces comprise the target centroid, the test direct distance parameter. As a direct distance parameter may be associated with multiple distance constraints comprising the same numerical value, the linear combination may comprise the overall direct distance parameter subtracted with an integer multiple of such a direct distance parameter.

In a preferred embodiment, the minimal spanning subset is determined from the candidate set via a pairwise comparison of numerical constraints of the candidate set based on a relative prioritization of numerical constraints.

In a preferred embodiment, the spanning tree is a minimum spanning tree (MST). Weights may be associated with the numerical constraints of the candidate set to determine the minimal spanning subset. The first graph data may comprise edge weights to determine the MST. Alternatively and preferably, a relative prioritization of numerical constraints is provided to compare pairs of numerical constraints of the candidate set. In this case, weights do not have to be associated explicitly with the numerical constraints of the candidate set and/or the edges of the first graph data.

A comparison-based MST algorithm may be utilized to obtain the minimal spanning subset based on the first graph data and the relative prioritization. A non-limiting list of comparison-based MST algorithms comprises Chazelle's algorithm (doi: 10.1145/355541.355562), Pettie and Ramachandran's algorithm (doi: 10.1145/505241.505243), and Prim's algorithm (doi: 10.1002/j.1538-7305.1957.tb01515.x).

A prioritization list comprises the following items:
pre-existence of a constraint in the CAD model;
magnitude of the numerical value of a numerical constraint;
tangency of multiple entities;
number of occurrences of a numerical value;
number of coplanar faces;
number of entities a numerical constraint relates to;
in case a constraint relates to multiple entities, whether the entities are overlapping; and
whether a constraint relates to a material (e.g. the inside of a solid) or a gap (e.g. the space in between solids).

In a preferred embodiment, the relative prioritization is based on at least two, preferably at least three, more preferably at least four, even more preferably at least five, yet even more preferably at least six, items of the prioritization list. Preferably, the relative prioritization is based on all properties of the prioritization list. Preferably, the above-mentioned prioritization list is an ordered prioritization list, and the relative prioritization is based on at least two, preferably at least three, more preferably at least four, even more preferably at least five, and most preferably all, items of the ordered prioritization list and their order within the ordered prioritization list.

In a preferred embodiment, a selection of a parameter of the parameter set is received via a user input device. For the selected parameter, a lower bound numerical value and an upper bound numerical value are determined. Via a visualization means, a plurality of two-dimensional images are displayed consecutively in time. Each image relates to a numerical value for the selected parameter within an interval defined by the lower bound numerical value and the upper bound numerical value. At least two images relate to different numerical values within said interval. The image may relate to the entire CAD model or a part of the CAD model. The images relate to at least a part of the CAD model. Preferably, the numerical values for the selected parameter of the consecutive images comprise a discretized triangular profile in time, with maximum the upper bound numerical value and minimum the lower bound numerical value. The computer system may comprise the user input device and the visualization means.

In a preferred embodiment, a cost function is constructed based on the parameter set. Numerical values for the parameters of the parameter set are determined by optimizing the cost function. The parametric constraints are updated, or the previously added parametric constraints are replaced with new parametric constraints, based on the determined numerical values for the parameters of the parameter set. An input cost function may obtained via user input. The input cost function may be based on material volume, material price, structural properties, strength properties, or the like. The input cost function may be based on user input related to entities and/or geometric properties of entities and/or relative geometric properties of entities. A new cost function may then be automatically be constructed based on the input cost function and the parameter set and parametric constraints of the CAD model.

The invention is further described by the following non-limiting examples which further illustrate the invention, and are not intended to, nor should they be interpreted to, limit the scope of the invention.

EXAMPLES

Example 1: Embodiment of an Algorithm According to the Present Invention

The present example describes an embodiment of an algorithm according to the present invention. The CIM may comprise steps according to the algorithm. The CPP may comprise instructions which, when the CPP is executed by a computer, cause the computer to carry out the algorithm. The computer system may be configured to perform the algorithm.

An unconstrained CAD model comprises one or more three-dimensional solids. Each solid comprises several faces. The faces of the CAD model are grouped in sets according to their orientation, in particular according to their normal directions. Multiple sets of at least three mutually parallel faces are thereby obtained. All faces of a set are orthogonal to a common normal direction, and the set comprises all faces of the CAD model orthogonal to said common normal direction. For each set of faces, a parameter set is determined as described in the subsequent paragraphs of this example, and as illustrated in the subsequent examples.

A fully connected first graph is set up. The faces of the set are represented as nodes of the first graph. A candidate set of distance constraints is determined. The candidate set comprises for any two faces of the set of faces a distance constraint. The distance constraint comprises as numerical value the relative distance between the two faces according to the CAD model.

The candidate set overconstrains the CAD model. When a numerical value of a distance constraint is changed, the other constraints counteract this change, as a set of faces comprises at least three faces. Therefore, a minimum spanning tree (MST; second graph) is searched in the first graph to overcome the overconstraining. To obtain the MST, edges are removed from the first graph. As several MSTs are possible, a choice needs to be made. To determine which constraints are more important than others, a lexicographical ordering is used that prioritizes certain characteristics of the constraints. The applied order is:
  existing constraints
  overall constraints
  glue between solids
  high occurrence of same distance
  multiple faces in one plane
  constraints within one solid
  overlapping solids
  material/non-material The edges of the MST determine a minimal spanning subset of the candidate set, which relieves the problem of overconstraining.

Every uniquely occurring numerical value is represented by a direct parameter. Subsequently, it is investigated whether one or more substitutable direct distance parameters can be identified, for expression in function of a new parameter and one or more other direct parameters. The investigation comprises the clustering and the two conditional properties on the associated numerical value, as described in the detailed description. In case a substitutable direct distance parameter is identified in a cluster, it is replaced with a functional expression. The functional expression is hereby a new scaling parameter multiplied with a linear combination of at least one other direct parameter. Said linear combination comprises the overall direct parameter, optionally subtracted with integer multiples of further distance constraints, based on the coincidence of projected faces of test distance constraints and a target centroid, as described in the detailed description.

A parametrized CAD model is obtained, which can be scaled and where frequently occurring distances can be changed at once.

Example 2: First Exemplary CAD Model

FIG. 1 shows a two-dimensional image of a solid of an exemplary CAD model. The solid can be parametrized according to the algorithm of the first example. Per direction X, Y and Z a set of all faces orthogonal to the direction is obtained.

A first set comprises all faces 11, 12, 13, 14, 15, 16, 17, 18 orthogonal to the Z-direction. All 8(8−1)/2=28 distances between all possible pairs of the faces of the first set of faces are determined based on the CAD model. A first fully connected graph comprising edges representing candidate distance constraints based on all these distances is obtained. The first fully connected graph is trimmed based on the lexicographical ordering to obtain a first MST representing a first minimal spanning subset of distance constraints. The first minimal spanning subset comprises distance constraints based on the total height H, the seating thickness h1, the seating height h2 (which occurs 4 times, once for each of the faces 12, 13, 14, 15), and the back support height h3. For each uniquely occurring numerical value, a direct parameter is obtained:
  $pm_1$ for the total height H,
  $pm_2$ for the seating thickness h1,
  $pm_3'$ for the seating height h2 (which occurs 4 times), and
  $pm_4$ for the back support height h3.

The overall direct parameter for the first set of faces is $pm_1$, associated with the total height H. One substitutable direct parameter is identified, namely $pm_3'$ associated with the seating height h2, which is replaced with a new scaling parameter $pm_3$ multiplied with pm:
  $pm_3' \rightarrow pm_3\, pm_1$.

A second set comprises all faces 21, 22, 23, 24, 25, 26, 27, 28 perpendicular to the Y-direction. All 8(8−1)/2=28 distances between all possible pairs of the faces of the second set of faces are determined based on the CAD model. A second fully connected graph comprising edges representing candidate distance constraints based on all these distances is obtained. The second fully connected graph is trimmed based on the lexicographical ordering to obtain a second MST representing a second minimal spanning subset of distance constraints. The second minimal spanning subset comprises distance constraints based on the total width W, the back rest pillar thickness w1, w2 (which occurs 2 times), and the chair leg thickness w3, w4, w5, w6 (which occurs 4 times). For each uniquely occurring numerical value, a direct parameter is obtained:
  $pm_5$ for the total width W,
  $pm_6$ for the back rest pillar thickness w1, w2, and
  $pm_7$ for the chair leg thickness w3, w4, w5, w6.

The overall direct parameter for the second set of faces is $pm_5$, associated with the total width W.

A third set comprises all faces 31, 32, 33, 34, 35, 36, 37, 38, 39 perpendicular to the X-direction. All 9(9−1)/2=36 distances between all possible pairs of the faces of the third set are determined based on the CAD model. A third fully connected graph comprising edges representing candidate distance constraints based on all these distances is obtained. The third fully connected graph is trimmed based on the lexicographical ordering to obtain a third MST representing a third minimal spanning subset of distance constraints. The third minimal spanning subset comprises distance constraints based on the total depth D, the back rest pillar depth d1, d2 (which occurs 2 times), the chair leg depth d3, d4, d5, d6 (which occurs 4 times), and the back support thickness d7. For each uniquely occurring numerical value, a direct parameter is obtained:
  $pm_8$ for the total depth D,
  $pm_9$ for the back rest pillar depth d1, d2,
  $pm_{10}$ for the chair leg depth d3, d4, d5, d6, and
  $pm_{11}$ for the back support thickness d7.

The overall direct parameter for the third set is $pm_8$, associated with the total depth D.

Eleven parameters (and corresponding assigned numerical values) and eleven related parametric constraints are added to the CAD model:
  $pm_1 = H$
  $pm_2 = h1$ $pm_3 = h2/H$, whereby the parametric seating height constraint comprises
$pm_3\ pm_1$
$pm_4 = h3$
$pm_5 = W$
$pm_6 = w1\ (=w2)$
$pm_7 = w3(=w4=w5=w6)$
$pm_8 = D$
$pm_9 = d1(=d2)$
$pm_{10} = d3\ (=d4=d5=d6)$
$pm_{11} = d7$ The algorithm according to the first example is hence configured to determine a parameter set which recognizes design intent. It is able to express parametric constraints in terms of parameters which a designer would use. This is enabled via the lexicographical ordering to construct the MST and via the determination of functional expressions for substitutable direct parameters, cfr. $pm_3$.

Example 3: Second Exemplary CAD Model

Figure 2:
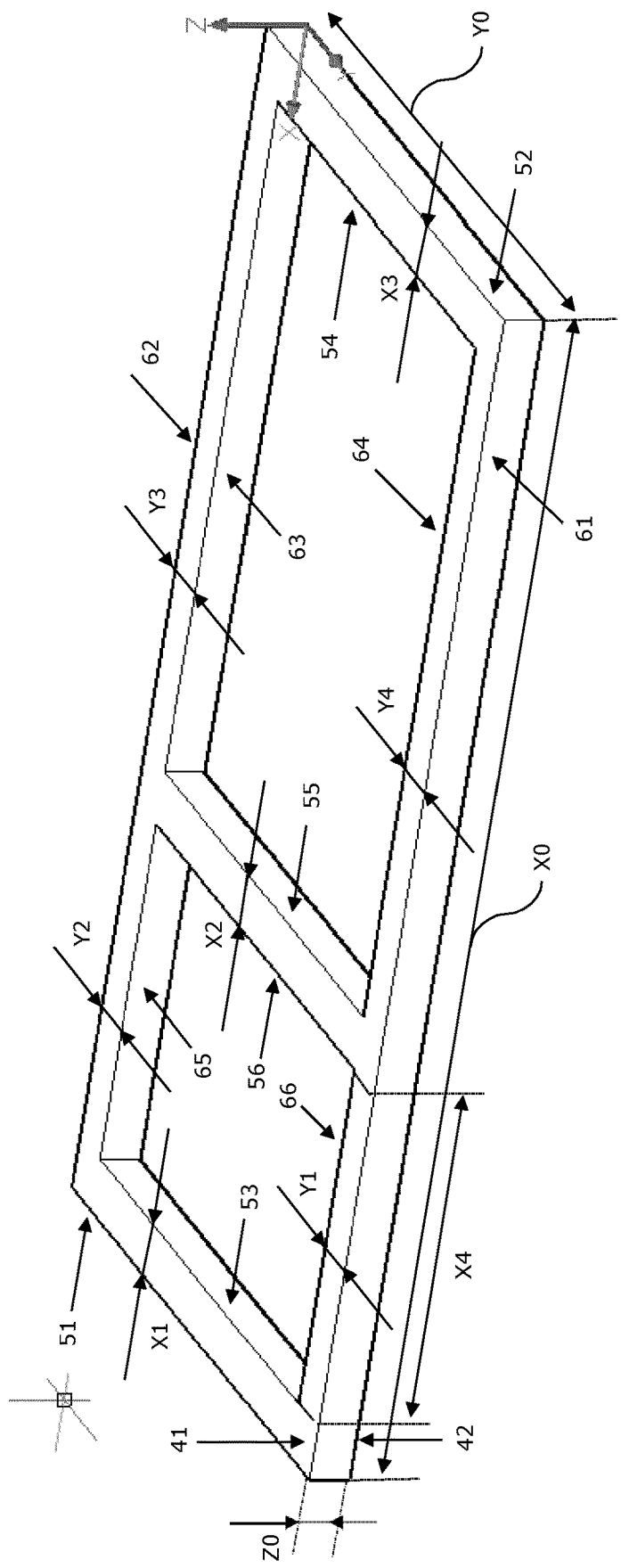

FIG. 2 shows a two-dimensional image of a solid of an exemplary CAD model. The solid can be parametrized according to the algorithm of the first example. Per direction X, Y and Z a set of all faces orthogonal to the direction is obtained.

A first set comprises all faces 41, 42 orthogonal to the Z-direction. One corresponding distance Z0 is determined based on the CAD model. As the first set only comprises two faces, a construction of a first fully connected graph and the subsequent trimming to a first MST does not have to be performed. A direct parameter (overall direct parameter) is obtained based on this distance:
$pm_1$ for the distance Z0.

A second set comprises all faces 51, 52, 53, 54, 55, 56 orthogonal to the X-direction. All 6(6−1)/2=15 distances between all possible pairs of the faces of the second set of faces are determined based on the CAD model. A second (merely referring to the 'second' set of faces) fully connected graph comprising edges representing candidate distance constraints based on all these distances is obtained. The second fully connected graph is trimmed based on the lexicographical ordering to obtain a second MST representing a second minimal spanning subset of distance constraints. The second minimal spanning subset comprises distance constraints based on the total frame length X0, the border length x1, x2, x3 (which occurs 3 times), and the upper frame opening length x4. For each uniquely occurring numerical value, a direct parameter is obtained:
$pm_2$ for the total frame length X0,
$pm_3$ for the border length x1, x2, x3 (which occurs 3 times), and
$pm_4'$ for the upper frame opening length x4.

The overall direct parameter for the second set of faces is $pm_2$, associated with the total frame length X0. One substitutable direct parameter is identified, namely $pm_4'$ associated with the upper frame opening, which is replaced with a new scaling parameter $pm_4$ multiplied with a linear combination of $pm_2$ and $pm_3$:
$pm_4' \rightarrow pm_4\ (pm_2 - 3\ pm_3)$.

A third set comprises all faces 61, 62, 63, 64, 65, 66 perpendicular to the Y-direction. All 6(6−1)/2=15 distances between all possible pairs of the faces of the third set of faces are determined based on the CAD model. A third fully connected graph comprising edges representing candidate distance constraints based on all these distances is obtained. The third fully connected graph is trimmed based on the lexicographical ordering to obtain a third MST representing a third minimal spanning subset of distance constraints. The third minimal spanning subset comprises distance constraints based on the total frame width Y0, and the border width y1, y2, y3, y4 (which occurs 4 times). For each uniquely occurring numerical value, a direct parameter is obtained:
$pm_5$ for the total frame width Y0, and
$pm_6$ for the border width y1, y2, y3, y4 (which occurs 4 times).

The overall direct parameter for the third set of faces is $pm_5$, associated with the total frame width Y0.

Six parameters (and corresponding assigned numerical values) and six related parametric constraints are added to the CAD model:
$pm_1 = Z0$
$pm_2 = X0$
$pm_3 = x1(=x2=x3)$
$pm_4 = x4/(X0 - 3\ x1)$, whereby the parametric upper frame opening length constraint comprises $pm_4\ (pm_2 - 3\ pm_3)$
$pm_5 = Y0$
$pm_6 = y1(=y2=y3=y4)$ The algorithm according to the first example is hence configured to determine a parameter set which recognizes design intent. It is able to express parametric constraints in terms of parameters which a designer would use. This is enabled via the lexicographical ordering to construct the MST and via the determination of functional expressions for substitutable direct parameters, cfr. $pm_4$.

The invention claimed is:

1. Computer-implemented method for automatic parametrization of a computer-aided design model, the model comprising a set of at least three subentities, wherein the method comprises the steps of:
    obtaining a candidate set of pairwise numerical constraints for the set of subentities, such that a first graph comprising nodes and edges, whereby each subentity of the set of subentities is represented by a node of the first graph and each pairwise numerical constraint of the candidate set is represented by an edge of the first graph, is connected;
    obtaining a minimal spanning subset of pairwise numerical constraints from the candidate set, such that a second graph comprising nodes and edges, whereby each subentity of the set of subentities is represented by a node of the second graph and each pairwise numerical constraint of the minimal spanning subset is represented by an edge of the second graph, is a spanning tree;
    determining a parameter set to parameterize the pairwise numerical constraints of the minimal spanning subset;
    adding the parameter set to the computer-aided design model;
    adding parametric constraints to the computer-aided design model based on the determined parameter set and the numerical values of the numerical constraints of the minimal spanning subset; and
    modifying the computer-aided design model to include computer-processable parameter data representing parameters of the parameter set and parametric constraint data representing the parametric constraints to obtain a parameterized computer-aided design model.

2. Computer-implemented method according to claim 1, wherein determining the parameter set comprises the step of associating a direct parameter with each uniquely occurring numerical value of the numerical constraints of the minimal spanning subset.

3. Computer-implemented method according to preceding claim 2, wherein determining the parameter set comprises the further step of determining for a substitutable direct parameter a new parameter and a functional expression expressing the substitutable direct parameter in function of the new parameter and at least one other direct parameter.

4. Computer-implemented method according to claim 1, wherein the model comprises a three-dimensional solid comprising a subentity of the set of subentities.

5. Computer-implemented method according to claim 1, wherein the set of at least three subentities comprises at least three mutually parallel faces, and wherein a numerical constraint of the minimal spanning subset is a distance constraint.

6. Computer-implemented method according to claim 3, wherein the direct parameters comprise an overall direct distance parameter associated with an overall numerical distance constraint comprising an overall numerical value for an overall pair of parallel faces, wherein the substitutable direct parameter is a distance parameter associated with a second numerical distance constraint comprising a second numerical value for a second pair of parallel faces, wherein the faces of the overall and the second pair are parallel, and wherein the overall numerical value is larger than the second numerical value.

7. Computer-implemented method according to preceding claim 3, wherein the method comprises the steps of:
   determining one or more reference planes, each reference plane comprising one face or multiple coplanar faces of the set of subentities;
   determining for each reference plane a centroid of the faces comprised within the reference plane, the centroid comprising coordinates;
   determining for the centroids a number of clusters K and partitioning the centroids into K clusters, based on the coordinates of the centroids;
   associating a direct distance parameter, which is associated with a numerical distance constraint, with a cluster which comprises a centroid of a reference plane comprising a face associated with said distance constraint;
   identifying for a cluster a substitutable direct distance parameter associated with the cluster;
   determining for an identified substitutable direct distance parameter a new parameter and a functional expression expressing the identified substitutable direct distance parameter in function of the new parameter and at least one other direct distance parameter.

8. Computer-implemented method according claim 6, wherein the overall numerical value is maximal over the numerical values of the numerical distance constraints for all pairs of faces of the set of subentities which are parallel to the overall pair of faces, and wherein a substitutable direct distance parameter is identified for a cluster in case:
   the second numerical value is maximal over the numerical values of the numerical distance constraints associated with the direct distance parameters associated with said cluster which are not the overall direct distance parameter; and
   optionally, the second numerical value lies within fractional bounds of the overall numerical value.

9. Computer-implemented method according to claim 7, wherein determining for the identified substitutable direct distance parameter a new parameter and a functional expression comprises:
   determining a target centroid of an intersection of the faces of the overall pair projected onto a projection plane parallel to the overall pair of faces along a normal direction perpendicular to the overall pair of faces; and
   verifying for each test numerical distance constraint for a test pair of parallel faces associated with a test direct distance parameter, for which:
      the faces are perpendicular to the normal direction;
      a cluster is associated with both the test and the substitutable direct distance parameter;
      the test direct distance parameter is not the overall or the substitutable direct distance parameter,
      whether both faces of the test pair projected onto the projection plane along the normal direction comprise the target centroid,
      said functional expression comprising the new parameter multiplied with a linear combination of at least one other direct distance parameter, said linear combination comprising the overall direct distance parameter subtracted with, per test distance constraint for which both projected faces comprise the target centroid, the test direct distance parameter.

10. Computer-implemented method according to claim 1, wherein the minimal spanning subset is determined from the candidate set via a pairwise comparison of numerical constraints of the candidate set based on a relative prioritization of numerical constraints.

11. Computer-implemented method according to preceding claim 10, wherein the spanning tree is a minimum spanning tree.

12. Computer-implemented method according to claim 4, wherein the relative prioritization is based on at least two, optionally at least three, of:
   pre-existence of a constraint in the model;
   magnitude of the numerical value of a constraint;
   tangency of entities;
   number of occurrences of a numerical value;
   number of coplanar faces;
   number of entities a constraint relates to;
   in case a constraint relates to multiple entities, whether the entities are overlapping; and
   whether a constraint relates to a material or a gap.

13. Computer-implemented method according to claim 1, wherein the candidate set is obtained such that the first graph is fully connected.

14. Computer-implemented method according to claim 1, wherein the method comprises the step of storing the computer-aided design model comprising the parameter set and the parametric constraints on a tangible non-transitory computer-readable storage medium.

15. Computer-implemented method according to claim 1, wherein the method comprises the steps of:
   receiving via a user input device a selection of a parameter of the parameter set;
   determining for the selected parameter a lower bound numerical value and an upper bound numerical value;
   displaying via a visualization means a plurality of two-dimensional images consecutively in time, wherein each image relates to a numerical value for the selected parameter within an interval defined by the lower bound numerical value and the upper bound numerical value, and wherein at least two images relate to different numerical values within said interval, optionally wherein each image relates to a numerical value for the selected parameter of a discretized triangular profile in time with maximum the upper bound numerical value and minimum the lower bound numerical value.

16. Computer-implemented method according to claim 1, wherein the method comprises the steps of:

constructing a cost function based on the parameter set;
determining numerical values for the parameters of the parameter set by optimizing the cost function;
updating the parametric constraints, or replacing the added parametric constraints with new parametric constraints, based on the determined numerical values for the parameters of the parameter set.

17. Computer system for automatic parametrization of a computer-aided design model, the computer system comprising a tangible non-transitory computer-readable data carrier carrying instructions that when executed by the computer system cause performance of the computer-implemented method according claim 1.

18. Computer program product for automatic parametrization of a computer-aided design model, the computer program product comprising a tangible non-transitory computer-readable data carrier carrying instructions which, when the computer program product is executed by a computer, cause the computer to carry out the computer-implemented method according to claim 1.

* * * * *